United States Patent [19]

Imai et al.

[11] 4,164,167

[45] Aug. 14, 1979

[54] HYDRAULIC SERVOMECHANISM

[75] Inventors: Isao Imai; Mitsuru Muto, both of Yokohama, Japan

[73] Assignee: Ishikawajima-Harima Jukogyo Kabushiki Kaisha, Tokyo, Japan

[21] Appl. No.: 744,106

[22] Filed: Nov. 22, 1976

[30] Foreign Application Priority Data

Nov. 21, 1975 [JP] Japan .................................. 50-140076
Oct. 23, 1976 [JP] Japan .................................. 51-127455

[51] Int. Cl.² .......................... F15B 9/03; F15B 9/09; F15B 13/16
[52] U.S. Cl. ................................... 91/363 R; 91/364; 91/433
[58] Field of Search ..................... 91/364, 361, 363 R, 91/363 A

[56] References Cited

U.S. PATENT DOCUMENTS 3,390,612 7/1968 Wills ........................................ 91/364
3,410,177 11/1968 Roess et al. ............................. 91/364

*Primary Examiner*—Paul E. Maslousky
*Attorney, Agent, or Firm*—Scrivener, Parker, Scrivener & Clarke

[57] ABSTRACT

Disclosed is a hydraulic servomechanism including a control loop consisting of an input device, an adder-amplifier, a servovalve, a cylinder or actuator and a load operatively connected in the order named for controlling the position of the load, a position feedback loop and an acceleration feedback loop. In one embodiment of the invention, the hydraulic servomechanism further includes a feedback loop wherein an output from an accelerometer or pressure sensor for detecting a differential pressure across a piston in the cylinder and an error signal from the adder-amplifier are arithmetically processed and fed back to the adder-amplifier. In another embodiment, the hydraulic servomechanism further includes an additional feedback loop wherein an output from a two-input adder to which are applied a signal representative of a supply pressure of working oil to be delivered from the servovalve to the cylinder and a signal representative of a pressure difference across a piston of the cylinder is arithmetically processed and fed back to a divider inserted between the adder-amplifier and the servovalve. In both embodiments, shocks are substantially eliminated in a hydraulic system.

3 Claims, 9 Drawing Figures

FIG. I
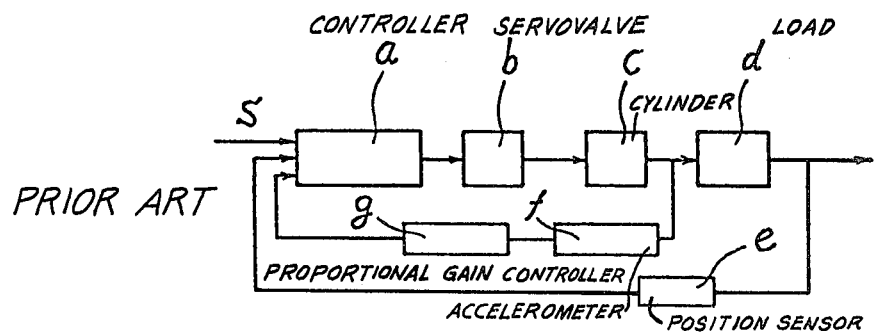
PRIOR ART
FIG. 2
(A)
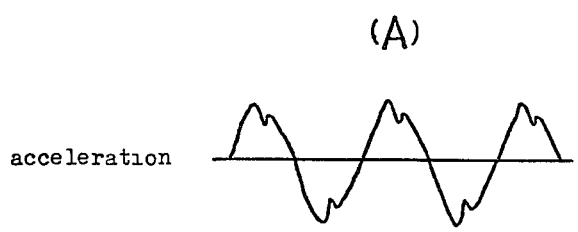
acceleration
(B)
load pressure
FIG. 3
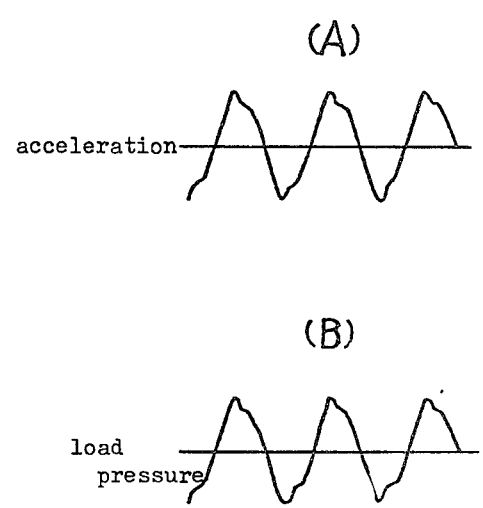
(A)
acceleration
(B)
load pressure (A) $\pm \dfrac{M}{2AP_s} k x x_s$ (B) $H(x_s)$ (C) $\beta$

HYDRAULIC SERVOMECHANISM

DETAILED DESCRIPTION OF THE INVENTION

The present invention relates to hydraulic servomechanisms which may be used in conjunction with various machines and equipment used not only in general industry but also in space industry for controlling positions, forces, speeds and so on.

In the conventional hydraulic servomechanisms, even when a sinusoidal waveform input is applied, distortions of acclleration waveforms or waveshapes occur because of nonlinear characteristics of servovlves. However, according to the present invention flow characteristic of a servovalve may be linearized and suitable damping may be provided and maintained constant so that distortions of acceleration waveforms may be substantially eliminated and consequently the smooth operation of a hydraulic system without shocks may be ensured.

So far with the conventional acceleration vibration testing of shaking table machines precise measurements could not be obtained because of the reasons described above, but with a testing machine incorporation a hydraulic mechanism in accordance with the present invention, measurements are obtained with a higher degree of accuracy hitherto unattainable by a conventional testing machines.

One of the objects of the present invention is therefore to provide a hydraulic servomechanism which is highly stable and dependable in operation.

Another object of the present invention is to provide a hydraulic servomechanism which is extremely simple in construction and assembly.

The present invention will become more apparent from the following comparison with and analysis of the prior art hydraulic servomechanisms and description of two preferred embodiments of the present invention taken in conjunction with the accompanying drawings, in which:

FIG. 1 is a block diagram of a prior art hydraulic servomechanism;

FIGS. 2(A)(B) 3(A)(B) show waveforms of acceleration and load pressure used for the explanation of the servomechanism shown in FIG. 1;

Figure 4:
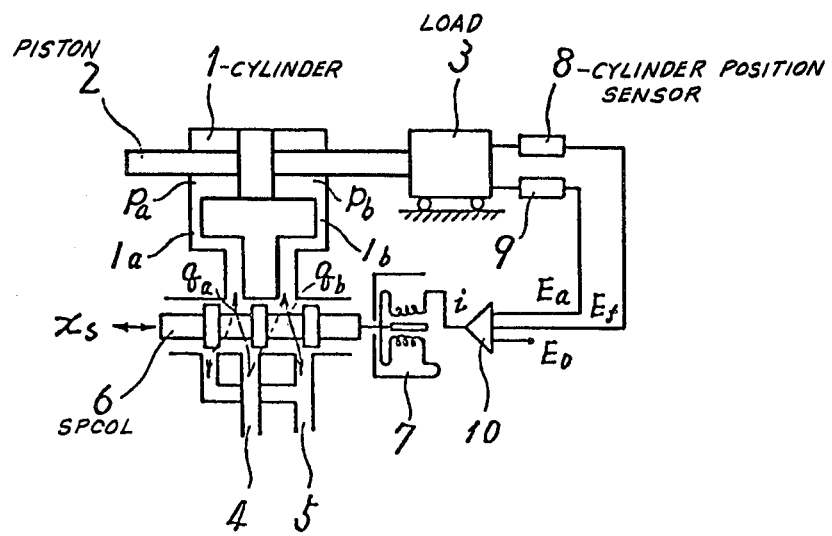
FIG. 4 is a schematic diagram of a hydraulic servomechanism model used for analysis of its characteristics.
Figure 8:
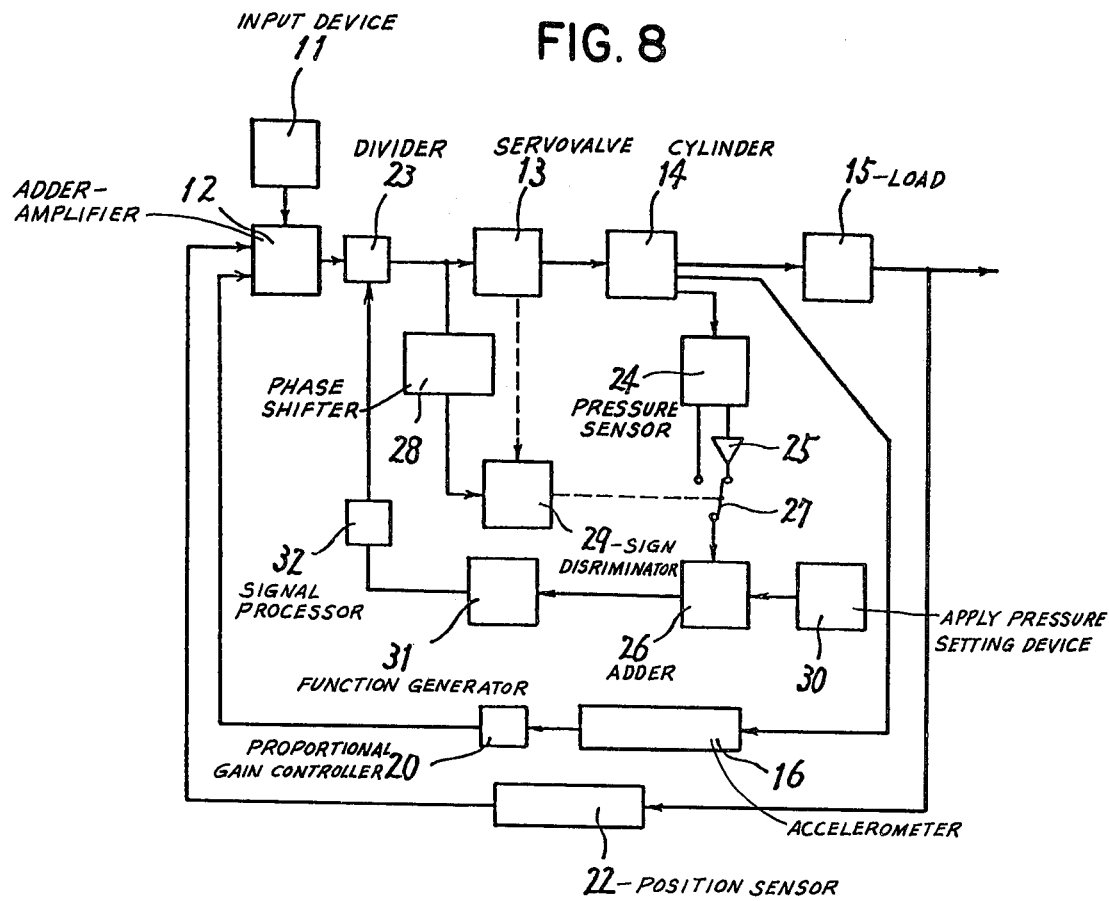
FIG. 8 is a block diagram of a second embodiment of the present invention.

FIGS. 4 and 8, same reference numerals are used to designate similar parts.

PRIOR ART

When an electro-hydraulic servovalve is used to control the position of a load having a higher inertia as in a vibration testing machine, in addition to the feedback of an output signal from a position sensor the feedback of an acceleration signal through proportional controller is effected in order to damp hydraulic shocks caused when the servovalve is changed over thereby improving the stability. That is, as shown in FIG. 1, in response to an input signal S a controller a controls a servovalve b which in turn controls the operation of a cylinder c for controlling the position of a load d. The displacement of the load d is detected by a position sensor e and an output signal from the sensor e is fed back to the controller a. Concurrently, an acceleration of the piston in cylinder c is detected by an accelerometer f and an output from the accelerometer f is fed back through a proportional gain controller g to the controller a.

However, as will be described in more detail hereinafter, a damping coefficient of a control system varies depending upon an absolute value of an input signal so that a satisfactory control can not be attained only by the proportional gain control of an acceleration feedback signal. Without the acceleration feedback, waveforms representing both an acceleration and load are extremely distorted from a sinusoidal input as shown in FIGS. 2(A) and (B), respectively. Even with an acceleration feedback with a proportional gain control, waveforms representative of an acceleration and a load pressure are also distored into sawtooth waveforms as shown in FIGS. 3(A) and (B), respectively. These distortions cause shocks in a hydraulic control system, adversely affecting the operation of a machine incorporating this control system. These shocks adversely affect the quality of waveform of acceleration especially in acceleration vibration testing machines to such a degree that the satisfactory performance cannot be expected at all.

A thorough analysis of a hydraulic servomechanism model shown in FIG. 4 will be made in order to overcome the above problems. In FIG. 4, a servovalve consisting of a spool 6 and a torque motor 7 for driving the spool 6 is interposed between high-pressure output lines or ports 1a and 1b of a cylinder 1 having a piston 2 connected to a load 3 and supply and return or sump lines 4 and 5 hydraulically communicated with a hydraulic pressure source (not shown) and a sump (not shown), respectively, so that the supply of hydraulic pressure to the cylinder 1 may be controlled by the displacement of the spool 6 of the servovalve. A cylinder position sensor 8 and an accelerometer 9 are operatively connected through a servoamplifier 10 to the torque motor 7 of the servovalve. In response to an input signal and feedback signals from the position sensor 8 and accelerometer 9, the servoamplifier 10 generates an error signal, in response to which the torque motor 7 is driven to displace the spool 6, thereby controlling the cylinder 1.

For the sake of analysis of the hydraulic servomechanism model with the above construction, the following assumptions are made:

(i) An output pressure supplied to the cylinder from the servovalve is constant and remains unchanged during the actuation of the cylinder and the return or sump pressure is zero.

(ii) The servovalve consists of an ideal zero-lapped hydraulic valve.

(iii) All of hydraulic pressure lines including ports between the servovalve and cylinder are combined into a common hydraulic subsystem which exhibits characteristics each of which is a combination of respective characteristics of the lines and ports, and inertia and friction due to viscosity of working oil are negligible.

(iv) Leakage within the cylinder as well as friction between sliding parts are negligible.

(v) The load 3 or vibration table consists of only an inertia load and friction is negligible. The piston rod is rigidly connected to the load.

(vi) Response of the sensor 8, accelerometer and servoamplifier 10 are sufficiently fast.

Under these assumptions, an input current i to the servovalve and an input voltage Eo to the servoamplifier 10 are given by $$i = \frac{k_a}{R}(E_o - E_f - E_a), \quad E_o = a \sin\omega t \qquad (1)$$

where
$E_f$=feedback voltage representative of a displacement,
$E_a$=feedback voltage representative of acceleration,
$k_a$=gain constant of servoamplifier,
$R$=internal resistance of servovalve,
$\omega$=vibration frequency, and
$a$=amplitude.

The dynamic characteristics of the servovalve may be approximated with first-order lag characteristic as follows;

$$T\frac{dx_s}{dt} + x_s = k_s i \qquad (2)$$

where
$T$=time constant,
$x_s$=displacement of spool and
$K_s$=spool gain constant.

Flow rates of hydraulic liquid or working oil passing through variable orifices of the servovalve are expressed by;

$$\left.\begin{array}{l} q_a = cx_s\sqrt{p_s - p_a} \\ q_b = cx_s\sqrt{p_b} \end{array}\right\}(x_s > 0) \qquad (3)$$

$$\left.\begin{array}{l} q_a = cx_s\sqrt{p_a} \\ q_b = cx_s\sqrt{p_s - p_b} \end{array}\right\}(x_s < 0) \qquad (4)$$

where
$p_s$=supply pressure,
$p_a$, $p_b$=line pressures,
$q_a$, $q_b$=flow rate at variable orifices, and
$c$=valve coefficient.

Suffixes a and b represent pressure lines 1a and 1b, respectively. Eqs. (3) and (4) show that depending upon whether $x_s$ is positive. or negative, the direction of flow of working oil is reversed.

Under the condition of continuity, in the pressure lines $$q_a = \frac{v_a}{K}\frac{dp_a}{dt} + A\frac{dx}{dt} + c_l(p_a - p_b) \qquad (5)$$

$$q_b = -\frac{v_b}{K}\frac{dp_b}{dt} + A\frac{dx}{dt} + c_l(p_a - p_b) \qquad (6)$$

Third terms of the right sides of Eqs. (5) and (6) represent leakages through variable orifices inserted in the pressure lines or ports 1a and 1b in order to impart the damping effect to the hydraulic servomechanism.

Volumes $v_a$ and $v_b$ of the pressure lines 1a and 1b which vary depending upon an stroke of the piston are expressed by;

$$v_a = v_o + Ax \qquad (7)$$

$$v_b = v_o - Ax \qquad (8)$$

where
$A$=pressure receiving area of cylinder (or area of piston on which pressure acts,)
$v_o$=volume of pressure line or port when piston is at the midpoint of its stroke,
$x$=displacement of piston from the midpoint.
$K$=bulk modulus of working oil, and
$c_l$=leakage coefficient at variable orifice.

Equation of motion of the vibration table or load is expressed by;

$$A(p_a - p_b) = M\frac{d^2x}{dt^2} \qquad (9)$$

where $M$=mass of vibration table.

Displacement and acceleration feedback voltages are expressed by;

$$E_f = c_f x, \quad E_a = c_a \frac{d^2x}{dt^2} \qquad (10), (11)$$

where $c_f$ and $c_a$=feedback constants.

The inventors considered that some distortions are introduced into the nonlinear characteristics of the above fundamental equations and therefore conducted very extensive simulations and found out that the pressure-flow rate characteristics of servovalves expressed by Eqs. (3) and (4) are responsible for introducing distortions.

Therefore the following approximations are introduced;

$$V_a \approx V_b \approx V_o \quad q_a \approx q_b \approx q_m \qquad (12)$$

where m=output flow rate of servovalve. Eq. (12) indicates that change in volume in pressure lines is negligible based on the observed fact that the change in volume in pressure lines will not cause any influences on the analyses of the hydraulic servomechanism.

By introducing $p_m = p_a - p_b$, one has $$c = k_x/\sqrt{\frac{p_s}{2}} \qquad (13)$$

where $k_x$=flow gain of servovalve with no load.

By substituting Eqs. (12) and (13) into Eqs. (3), (4), (5) and (6), they may be converted into the following forms;

$$q_m = \begin{cases} k_x x_s \sqrt{1 - p_m/p_s} & (x_s > 0) \\ k_x x_s \sqrt{1 + p_m/p_s} & (x_s < 0) \end{cases} \quad (14)$$

$$q_m = \frac{v_0}{2K} \frac{dp_m}{dt} + A \frac{dx}{dt} \quad (15)$$

In Eq. (15), the terms representative of the leakages at variable orifices are dropped or neglected, and by the binominal theorem, Eq. (15) may be approximated into the following form;

$$\sqrt{1 \mp p_m/p_s} \approx 1 \mp \frac{p_m}{2p_s} \quad (16)$$

As is clear from Eq. (14), the flow characteristics of the servovalve exhibit two linear characteristics. The first nonlinear characteristic is expressed in terms of the product of the displacement $x_s$ of the spool and the load pressure $p_m$ whereas the second nonlinear characteristic is associated with a square root of a load pressure. Eq. (16) shows that the second nonlinear characteristic is linearly approximated. When a load pressure is small, Eq. (16) gives satisfactory approximations, but when a load pressure is high, the third terms must be added or Eq. (14) must be analyzed.

From Eqs. (14), (15) and (16), one has $$k_x x_s (1 \mp p_m/2p_s) = \frac{v_0}{2K} \frac{dp_m}{dt} + A \frac{dx}{dt} \quad (17)$$

The negative sign − is used in the left side when $x_s > 0$ whereas the positive sign +, when $x_2 < 0$.

From Eqs. (9) and (17), one has $$k_x x_s (1 \mp \frac{M}{2Ap_s} \frac{d^2x}{dt^2}) = \frac{v_0 M}{2KA} \frac{d^3x}{dt^3} + A \frac{dx}{dt} \quad (18)$$

Reconstructing Eq. (18), one has $$\frac{v_0 M}{2KA} \frac{d^3x}{dt^3} \pm \frac{M}{2Ap_s} k_x x_s \frac{d^2x}{dt^2} + A \frac{dx}{dt} = k_x x_s \quad (19)$$

Eq. (19) shows the relationship between the displacement of the spool of the servovalve and the motion of the load or vibration table. Because of the integration characteristic of the cylinder, Eq. (19) is a differential equation of third order, and the coefficient of the second term of the left side is a function of $x_s$. By substituting $dx/dt = v$, one has $$\frac{v_0 M}{2KA} \frac{d^2v}{dt^2} - \frac{Mk_x}{2p_s A} |x_s| \frac{dv}{dt} + Av = k_s x_s \quad (20)$$

Eq. (20) is an equation of a forced oscillation with one degree of freedom. From Eq. (20), a damping coefficient of this system is $$\xi = \frac{k_x}{2p_s A} \sqrt{\frac{MK}{2v_0}} |x_s| \quad (21)$$

The inventors therefore considers that because the damping coefficient is a function of the displacement of the spool, distortions are introduced.

Therefore it follows that distortions may be eliminated when a correction or compensation system for maintaining a damping coefficient constant independently of the displacement of the spool. For this purpose, an acceleration feed back compensation expressed by $$\left( H_0 - \frac{Mk_x}{2p_s A} |x_s| \right) \frac{dv}{dt} \quad (22)$$

is introduced into Eq. (20). Then, the damping coefficient becomes $$\xi = H_0 \sqrt{\frac{k_x}{2v_0 M}} \quad (23)$$

Now the damping coefficient is constant. In other words, the cause for introducing distortions may be eliminated so that the waveforms may be improved to a higher degree of accuracy.

As described above, the cause for distortions is the nonlinear pressure-flow rate characteristic of the servovalve. Therefore the problem how distortions can be eliminated is now reduced to a problem how to eliminate this nonlinear characteristic. There are two approaches to this problem. One is the linearization of a servovalve and the other is the linearization of a control system by the introduction of acceleration feedback.

(i) Linearization of Servovalve;

In general, the conventional zero-lapped hydraulic servovalves have nonlinear characteristics, but when the negative or under-lapping is employed, an linear approximation may be obtained in a relatively small range. However, it is next to impossible to obtain completely linear characteristics. Furthermore, the obtain completely linear characteristics. Furthermore, the linearization results in decrease in efficiency, but it is very effective for improving acceleration waveforms.

(ii) Linearization by Introduction of Acceleration Feedback;

Nonlinear characteristic of the control system in the form of a first approximation is shown in Eq. (19). Therefore, Eq. (19) may be linearized by introducing such a compensation that the coefficient of the second term of the left side may become constant. Thus, $$\frac{v_0 M}{2KA} \frac{d^3x}{dt^3} + (\pm \frac{M}{2Ap_s} k_x x_s + H) \frac{d^2x}{dt^2} + A \frac{dx}{dt} = k_x x_s \quad (24)$$

The coefficient becomes constant if $$H = \beta \mp \frac{M}{2Ap_s} k_x x_s \quad (25)$$

Figure 5:
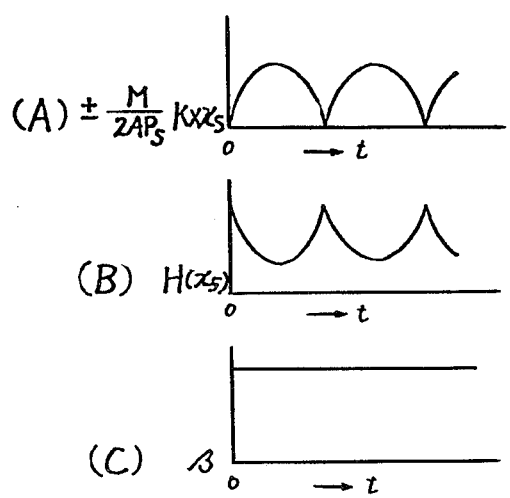
FIG. 5 is a graph used in the analysis of the servomechanism shown in FIG. 4 in conjunction with analytic equations (19), (21) and (25) to be described hereinafter.

That is, the control system may be represented by a linear equation by the introduction of an acceleration feedback with the coefficient H. The relation between the terms of Eq. (25) is shown in FIG. 5.

Eq. (25) may be converted into the following form wherein an acceleration feedback is introduced into the displacement of the spool of the servovalve;

$$\frac{v_o M}{2KA} \frac{d^3x}{dt^3} \pm \frac{M}{2Ap_s} k_x x_s \frac{d^2x}{dt^2} + A \frac{dx}{dt} = k_x x_o - H(x_s) \frac{d^2x}{dt^2} \quad (26)$$

When an acceleration feedback is zero, when $x_o = x_s$ and consequently Eq. (26) becomes Eq. (19).

So far the analyses have been based upon the approximation by the binominal expansion to the second order as shown in Eq. (16), but more precise approximations may be obtained by the expansion to the higher orders. For instance, the approximation by the binominal expansion to the third order results in;

$$\frac{v_o M}{2KA} \frac{d^3x}{dt^3} \pm \frac{1}{2p_s} \frac{M}{A} k_x x_s \frac{d^2x}{dt^2} + \frac{1}{8p_s^2} \frac{M^2}{A^2} k_x x_s \frac{d^2x}{dt^2} + A \frac{dx}{dt} = k_x x_s \quad (27)$$

Eq. (27) may be transformed into a linear equation by the introduction of a squared acceleration feedback of the third term of the left side in addition to the acceleration feedback by $H(x_s)$. Therefore more minute distortions may be further eliminated.

The present invention is based on the above analytical results and provides a hydraulic servomechanism wherein the feedback of an acceleration signal which is obtained by modulating a proportionally gain controlled acceleration with an absolute value of a displacement of a spool of a servovalve is effected to stabilize a control system. A first embodiment of the present invention is shown in block diagram in FIG. 6.

In order to attain the completely satisfactory compensation effects, the following analysis was further made. In the hydraulic servomechanism of the type shown in FIG. 4, even though a sinusoidal waveform input is applied, both acceleration and load pressure waveshapes are considerably distored. The distortions are caused by the pressure-flow rate characteristic of a zero-lapping hydraulic servovalve which is expressed by $$q_m = \frac{k_x}{\sqrt{p_s}} x_s \sqrt{p_s - p_m} \quad q_m = \frac{k_x}{\sqrt{p_s}} x_s \sqrt{p_s + p_m} \quad (28)$$
$$(x_s > 0) \qquad\qquad (x_s < 0)$$

Figure 7:
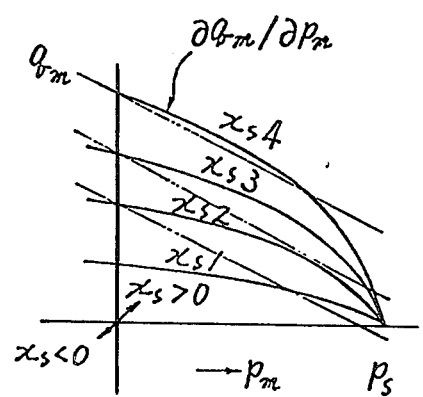
FIG. 7 is a graph used for the analysis of the servomechanism shown in FIG. 4 in conjunction with analytic equations (28) and (29) to be described hereinafter.

Eq. (28) is plotted as shown in FIG. 7 with $x_s$ as parameters. The distortions are caused by the fact that a slope $\partial q_m / \partial p_m$ representing damping varies depending upon the displacement of the spool.

In view of the above, according to the present invention a zero-lapping hydraulic servovalve whose characteristic is expressed by Eq. (28) is so controlled as to satisfy the following equation;

$$q_m = k_x x_2 - H_o p_m \quad (29)$$

where $H_o$ = gain constant indicated by a two-dot chain line in FIG. 7. Thus there may be provided a hydraulic servomechanism wherein distortions may be eliminated and smooth operations without shocks may be ensured. One example is shown in FIG. 8.

Figure 6:
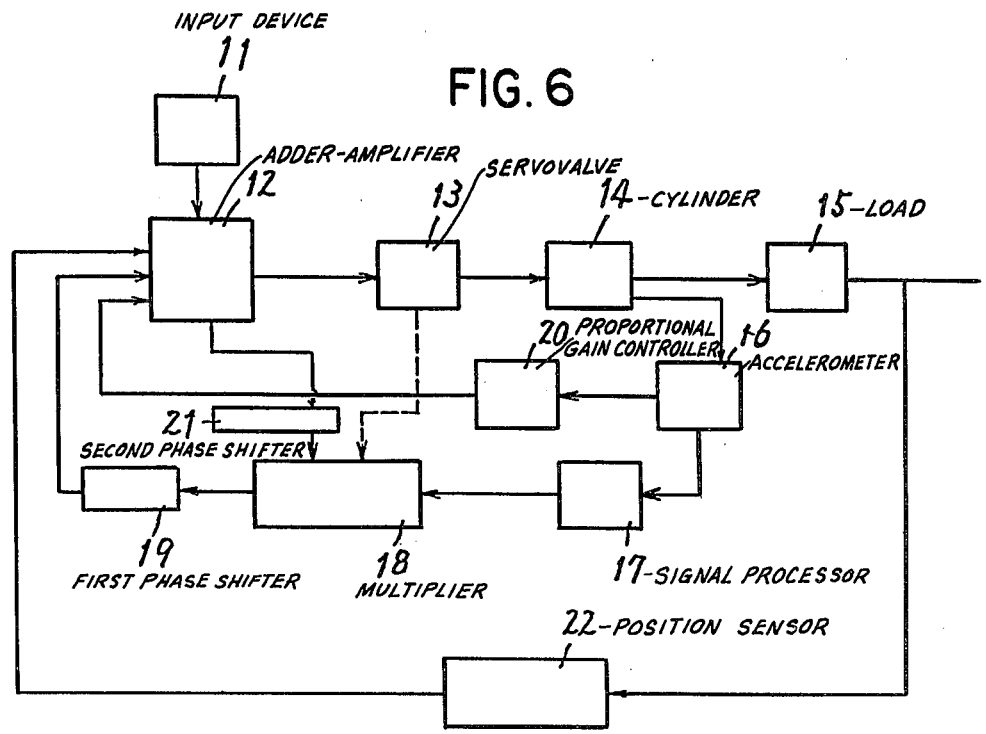
FIG. 6 is a block diagram of a first embodiment of the present invention.

First embodiment, FIG. 6

Referring to FIG. 6, the first embodiment of the present invention will be described in detail. A control loop consists of an input device 11, an adder-amplifier 12, a servovalve 13, a cylinder or actuator 14 and a load 15 so that in response to an input signal applied the input device 11, the load 15 is displaced. A first feedback loop consists of an accelerometer 16, a proportional gain controller 20 and the adder-amplifier 12. A second feedback loop consists of the accelerometer 16, a signal processor 17, a multiplier 18, a first phase shift or adjuster 19 and a second phase shifter or adjuster 21 through which is applied an error signal from the adder-amplifier 12 to the multiplier 18. A third feedback loop consists of a position sensor 22 so that a displacement of the load 15 may be fed back to the adder-amplifier 12.

In response to an input signal from the input device 11 and a position feedback signal from the position sensor 22, the adder-amplifier 12 generates an error signal in response to which a servo-current is applied to the servovalve 13 so that the cylinder 14 is actuated to displace the load 15. A displacement of the load 15 is sensed by the position sensor 22 so that a position feedback signal is transmitted to the adder-amplifier 12.

In the first feedback loop, an acceleration of a piston in the cylinder 14 is sensed by the accelerometer 16 and an output therefrom representing the detected acceleration is transmitted through the proportional gain controller 20 to the adder-amplifier 12.

In the second feedback loop, an output signal from the accelerometer is weighed by the signal processor 17 depending upon the load 15 and is further squared if required and then transmitted to the multiplier 18. An error signal from the adder-amplifier 12 corresponding to an electrical control signal to be applied to the servovalve 13 is adjusted in phase or lagged by phase equal to a phase lag of the servovalve 13 by the phase adjuster 21 and applied to the multiplier 18. The output from the second phase adjuster 21 and the output from the signal processor 17 are multiplied by the multiplier 18 and an output therefrom is transmitted through the first phase adjuster 19 to the adder-amplifier 12. An output from the multiplier 18 is advanced by a phase equal to a phase lag by the first phase adjuster 19. Instead of applying an error signal from the adder-amplifier 12 through the second phase adjuster 21 to the multiplier 18, a signal representative of a displacement of the spool of the servovalve 13 may be directly applied to the multiplier 18 as indicated by the broken lines in FIG. 6. Instead of the accelerometer 16, a pressure sensor for sensing the pressure difference across a piston of the cylinder 14 may be used and an output signal from the pressure sensor may be applied to the signal processor 17 and the proportional gain controller 20.

Figure 9:
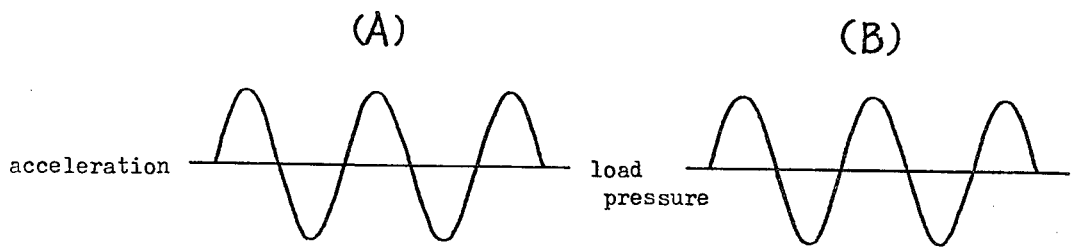
FIG. 9 shows waveforms of acceleration and load pressure used for the explanation of the first and second embodiments shown in FIGS. 4 and 8, respectively.

According to the first embodiment described above, the waveshapes representing an acceleration and load pressure may be made free from any distortions as shown in FIG. 9 so that the stable operation may be ensured.

Second Embodiment, FIG. 8

In the second embodiment shown in block diagram in FIG. 8, a control loop for controlling the position of the load 15, a third feedback loop for feedback of a signal representative of a displacement of the load and a first feedback loop for feedback of an acceleration signal through the proportional gain controller 20 to the adder-amplifier 12 are similar to those of the first embodiment described above in conjunction with FIG. 6.

The second embodiment further comprises a fourth feedback loop consisting of a pressure sensor 24 which senses a load pressure $p_m$ (differential pressure $p_m = p_a - p_b$) exerted by the piston in the cylinder 14 and which transmits a positive load pressure from one of two output terminals through a switch 27 to an adder 26 or a negative load pressure from the other output terminal through an inverter 25 and the switch 27 to the adder 26, the adder, a function generator or square-root circuit 31, a signal processor 32 and a divider 23 inserted between the adder-amplifier 12 and the servovalve 13. An output terminal of the divider 23 is connected to an input terminal of a third phase shifter 28 whose output terminal is connected to a signal discriminator 29 operatively coupled to the switch 27 so that in response to an output from the signal discriminator a movable contact of the switch 27 closes either one output terminal of the pressure sensor 24 or an output terminal of the inverter 25. Instead of applying an output from the divider 23 through the phase shifter 28 to the sign discriminator 29, a signal representative of a displacement of the spool of the servovalve 13 may be directly applied to the sign discriminator 29 as indicated by a broken line in FIG. 8. The fourth feedback loop further includes a supply pressure setting device 30 for setting a supply pressure of the working oil to be delivered from the servovalve 13 to the cylinder 14 (or a pressure sensor for detecting a supply pressure) so that an output from the pressure sensor 24 and an output from the supply pressure setting device 30 are added in the adder 26, an output from the adder 26 is square-rooted by the function generator or square-root circuit 31 (capable of generating an approximate value of a square root of an input), and an output from the function generator 31 is applied through the signal processor 32 to the divider 23. As in the case of the first embodiment, instead of the accelerometer 16, a pressure sensor for sensing a differential pressure across the piston of the cylinder 14 may be used.

Next the mode of operation of the second embodiment with the above construction will be described in more detail hereinafter. Applied to the adder-amplifier 12 are an input signal from the input device 11, a load position feedback signal through the third feedback loop including the position sensor 22 and an acceleration feedback signal through the first feedback loop consisting of the accelerometer 16 and the proportional gain controller 20. In response to these input and feedback signals, the adder-amplifier 12 generates an error signal which in turn is applied to the divider and is divided by an output signal from the signal processor 32. In response to an output signal from the divider 23, the servovalve 13 actuates the cylinder 14 which in turn controls the position of the load 15. A displacement of the load 15 is again sensed by the position sensor 22 and is fed back to the adder-amplifier 12. An acceleration of the cylinder is detected by the accelerometer 16, an output therefrom is controlled in gain by the proportional gain controller 20 and an output therefrom is fed back to the adder-amplifier 12.

Meanwhile an output from the divider 23 is also transmitted to the phase shifter 28 where the output is lagged by a phase equal to a phase lag of the servovalve 13 and an output from the phase shifter 28 is transmitted to the signal discriminator 29 which discriminates whether an input signal to the servovalve 13 is positive or negative. In response to an output from the signal discriminator 29, the movable contact of the switch 27 closes one output terminal of the pressure sensor 24 or the output terminal of the sign inverter 25 so that an output signal representative of a positive or negative load pressure $p_m$ or $-p_m$ is applied to the adder 26. The supply pressure setting device 30 transmits an output signal representative of a supply pressure of the working oil to be delivered from the servovalve 13 to the cylinder 14, to the adder 26. An output signal from the adder 26 representative of a sum of two input signals is transmitted through the function generator 31 to the signal processor 32 where an output signal from the function generator 31 is weighed depending upon the load 15. An output from the signal processor 32 is transmitted to the divider 23, and represents $(1/\sqrt{p_s})(\sqrt{p_s}-p_m)$ when $x_s>0$ or $(1/\sqrt{p_s})(\sqrt{p_s}+p_m)$ when $x_s<0$.

When a signal representative of a load pressure $p_m$ exerted to the cylinder 14 has a sign equal to a sign of a signal representative of a displacement of the spool of the servovalve 13, an output from the adder may be approximated by an absolute value of a difference between a supply pressure $p_s$ and a load pressure $p_m$; that is, by $|p_s-p_m|$.

For a zero-lapped hydraulic servovalve with the characteristic expressed by Eq. (28), the division of an output from the adder-amplifier 12 by an output from the signal processor 32 by the divider 23 results in the first term of the right side of Eq. (29) whereas an acceleration or load-pressure feedback signal results in the second term of the right side of Eq. (29).

Thus the servovalve 13 with non-linear characteristics is linearly controlled so that, as shown in FIG. 9, waveshapes of acceleration and load pressure may be made immune to distortions and consequently the stable operation may be ensured.

It is to be understood that the present invention is not limited to the first and second embodiments described above and that variations and modifications may be effected without departing from the true spirit of the present invention.

What is claimed is:

1. A hydraulic servomechanism wherein an input device, an adder-amplifier, a divider, a servovalve, a piston within a cylinder and a load are operatively coupled in the order named; a position sensor for detecting a displacement of said load operatively connected to said adder-amplifier; means for detecting an acceleration of said piston operatively connected to said adder-amplifier, an adder, a supply pressure setting device having its output terminal connected to one of two input terminals of said adder, a pressure sensor with two output terminals for detecting a pressure difference across said piston in said cylinder having one of said two output terminals connected directly to one of two stationary contacts of a switching means and the other output terminals connected to the other stationary contact through an inverter, a movable contact of said switching means being connected to the other input terminal of said adder, the output of the adder being connected through a function generator to said divider, an output terminal of said divider being connected to said switching means through a sign discriminator so that in response to an output signal from said sign discriminator said movable contact of said switching means closes either of said two stationary contacts thereof.

2. A hydraulic servomechanism as set forth in claim 1 wherein said output of said divider is connected to said sign discriminator through a phase shifter.

3. A hydraulic servomechanism as set forth in claim 1 wherein a signal representative of a displacement of a spool of said servovalve is transmitted to said sign discriminator.

* * * * *